(12) United States Patent
Mancini et al.

(10) Patent No.: US 6,797,095 B2
(45) Date of Patent: Sep. 28, 2004

(54) METHOD AND PLANT FOR MANUFACTURING A BELT STRUCTURE, A BELT PACKAGE AND A CROWN STRUCTURE OF A GREEN TIRE

(75) Inventors: Gianni Mancini, Turin (IT); Ezio Musitelli, Muggio' (IT); Pier Giuseppe Piantanida, Oleggio (IT)

(73) Assignee: Pirelli Pneumatici S.p.A., Milan (IT)

( * ) Notice: Subject to any disclaimer, the term of this patent is extended or adjusted under 35 U.S.C. 154(b) by 243 days.

(21) Appl. No.: 09/995,638

(22) Filed: Nov. 29, 2001

(65) Prior Publication Data

US 2002/0062908 A1 May 30, 2002

Related U.S. Application Data

(60) Provisional application No. 60/251,051, filed on Dec. 5, 2000.

(30) Foreign Application Priority Data

Nov. 29, 2000 (EP) .............................................. 00204248

(51) Int. Cl.⁷ ............................................. B29D 30/38
(52) U.S. Cl. ........................ 156/111; 156/130; 156/260; 156/271

(58) Field of Search ................................. 156/111, 117, 156/123, 124, 130, 133, 906, 907, 259, 260, 264, 271, 405.1, 406.4

(56) References Cited

U.S. PATENT DOCUMENTS

| | | | | |
|---|---|---|---|---|
| 1,406,855 A | * | 2/1922 | Harsel | 156/136 |
| 1,452,379 A | * | 4/1923 | Haren | 156/184 |
| 1,960,822 A | * | 5/1934 | Maney | 156/133 |
| 1,961,725 A | * | 6/1934 | Abbott, Jr. | 156/398 |
| 3,071,179 A | * | 1/1963 | Tourtellotte et al. | 156/380.2 |

* cited by examiner

Primary Examiner—Geoffrey L. Knable
(74) Attorney, Agent, or Firm—Finnegan, Henderson, Farabow, Garrett & Dunner, L.L.P.

(57) ABSTRACT

A method for manufacturing a belt structure of a vehicle tire includes the steps of preparing a belt assembly, cutting the belt assembly to obtain first and second substantially-continuous belt strips, supplying the first and second belt strips to at least one assembly drum, and superposing on the at least one assembly drum portions of the first and second belt strips to obtain a belt structure comprising radially-superposed portions of the first and second belt strips.

17 Claims, 8 Drawing Sheets

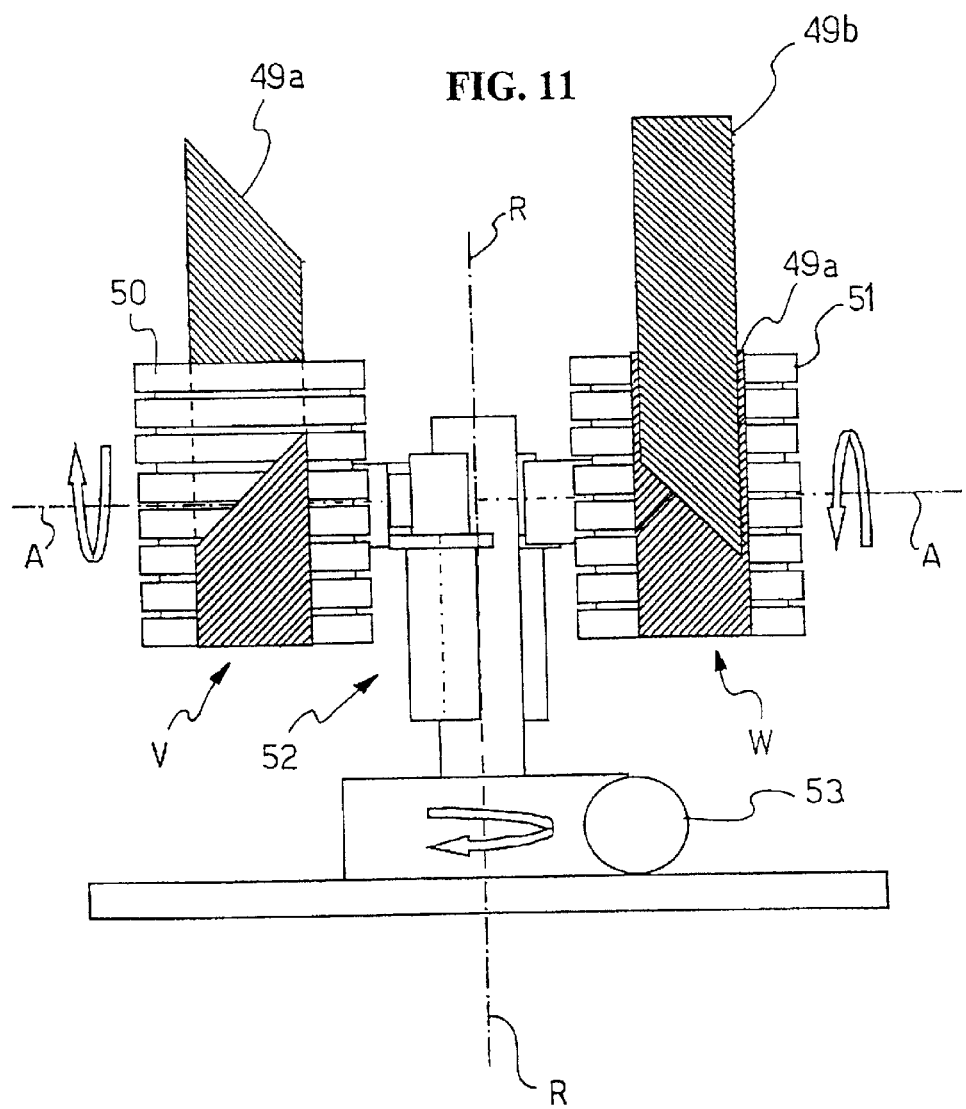

METHOD AND PLANT FOR MANUFACTURING A BELT STRUCTURE, A BELT PACKAGE AND A CROWN STRUCTURE OF A GREEN TIRE

CROSS-REFERENCE TO RELATED APPLICATIONS

Applicants claim the right of priority under 35 U.S.C. §119(a)–(d) based on patent application No. 00204248.9, filed Nov. 29, 2000, in the European Patent Office; additionally, Applicants claim the benefit under 35 U.S.C. §119(e) based on prior-filed, provisional application No. 60/251,051, filed Dec. 5, 2000, in the U.S. Patent and Trademark Office; the contents of both of which are relied upon and incorporated herein by reference.

DESCRIPTION

1. Field of the Invention

In a first aspect thereof, the present invention relates to a method for manufacturing a belt structure of a green tire for vehicles.

This invention also refers to a plant for manufacturing the belt structure, a method and a plant for manufacturing a belt package of a green tire incorporating the above-mentioned belt structure, as well as a method and a plant for manufacturing a crown structure of a green tire including the above-mentioned belt package.

2. Description of the Related Art

A green tire is essentially constituted by a composite structure obtained by assembling together a plurality of semi-finished products adapted to constitute a carcass comprising at least one airproof liner, two bead wires to which the edges of at least one carcass ply are associated after interposition of an elastomeric filling fixed to the radially outer surface of each bead wire, a belt structure arranged as a crown around the torically shaped carcass, a tread wrapped around the belt structure and a pair of axially opposite sidewalls, radially extending between the bead wires and the tread.

An additional belt layer incorporating a plurality of circumferentially oriented reinforcing cords, otherwise known as zero degree cords, may be inserted between the belt structure and the tread. Preferably, the above-mentioned additional layer is formed by spirally winding around the belt structure a ribbon (or tape) of rubber mixture incorporating a certain number of such cords.

In the following description and in the subsequent claims, the term "belt strip" is used to indicate a continuous strip of rubber-coated fabric provided with reinforcing cords parallel to one another.

In the following description and in the subsequent claims, the term "belt structure" is used to indicate a composite structure including at least a couple of portions of belt strips, obtained by cutting to size said continuous belt strips. Such structure is formed by radially superposing said portions of belt strips, so that the reinforcing cords incorporated in said portions are parallel to one another in each portion of belt strip and inclined with respect to the cords of the adjacent portion, generally in a symmetrical manner with reference to the equatorial plane of the tire. The portions of belt strips cut to size and radially superposed so as to form the belt structure are called in this way because they are obtained by cutting a substantially continuous strip of indefinite length named "belt strip".

In the following description and in the subsequent claims, the term "belt package" is used to indicate the assembly constituted by a belt structure and by an additional radially outer reinforcing layer incorporating the reinforcing cords oriented circumferentially with respect to the tire. Preferably, said additional layer is manufactured by spirally winding onto said belt structure, in subsequent spires axially placed side by side, a continuous ribbon (tape) of rubber-coated fabric of indefinite length, provided with reinforcing cords made of textile or metallic material, longitudinally arranged with respect to such ribbon.

Finally, in the following description and in the subsequent claims, the term "crown structure" is used to indicate a composite structure constituted by a belt package and by a tread arranged in turn as a crown around the additional layer of reinforcing cords of the belt package.

In the field of tire manufacturing, one of the requirements to be satisfied is notoriously that of imparting to the finished product high quality and long lasting characteristics, achieving at the same time a high production capacity of the manufacturing plant as a whole. In this respect, a critical factor which sharply influences the quality of the finished tire is the quality of the semi-finished products which form the tire structure once they have been assembled together.

The quality of the semi-finished products is in turn linked to the production methods and to the environmental conditions in which the semi-finished products are produced and optionally stored.

According to the prior art, in the manufacturing of the belt package of the green tire, the belt strips and the rubber mixture ribbon (or tape), both produced as a continuous ribbon, are wound around spools to form overlapping spires and are subsequently stored until they have to be used in the production line and assembled on an assembly drum.

A first problem connected to this type of handling of the semi-finished products is essentially linked to possible variations of the adhesion, of the chemical-physical characteristics and/or of the dimensional characteristics of the semi-finished products, which take place both during the winding onto the spool, during the storing period and during the various handling steps which such semi-finished products undergo before being used in the production line.

During the storing period in which they are kept in spools, in fact, a change of the humidity and temperature conditions of the storing environment from those considered to be optimal may lead to an unwanted variation of the rubber stickiness which, in case of a reduction thereof, creates process problems during the tire manufacture and, in case of an increase thereof, makes the semi-finished product unusable, generally because it becomes impossible to remove the semi-finished product from the spool with an ensuing waste of material.

A second problem connected to the methods of handling and storing the above-mentioned semi-finished products consists in the packing of the radially innermost layers of material in the spool, due to the weight of the material itself, which packing generally determines the appearance of undesired deformations and stresses which influence in turn the quality of the final product in a negative manner. In the worst cases, such packing of the layers may cause the rejection of the material which may no longer be used.

Another problem related to the above-mentioned handling methods of the semi-finished products, in particular of the belt structure, of the additional layer incorporating the zero degree cords and of the tread, consists in the need to carry out a series of cumbersome operations of loading and unloading of the spools in the assembling machine, operations which require both a continuous need for labor intervention and periodical stops, all to the detriment of the quality of the final product and of the productivity of the plant used for manufacturing the green tire.

SUMMARY OF THE INVENTION

The technical problem underlying the present invention is therefore that of providing a method and a plant for manufacturing a belt structure, a belt package and a crown structure of a green tire which enable the achievement both of the desired high and constant quality of the belt structure, of the belt package, of the crown structure and of the semi-finished products that constitute the same, and of a productivity increase of the global plant.

According to a first aspect of the invention, the above-mentioned technical problem is solved by a method for manufacturing a belt structure of a green tire for vehicles, comprising the steps of:

a) preparing, in a substantially continuous manner, a belt assembly incorporating reinforcing cords substantially parallel to one another and inclined at a predetermined angle with respect to the longitudinal axis of the belt assembly;

b) cutting, in a substantially continuous manner, the belt assembly along a cutting direction substantially parallel to the longitudinal axis thereof, so as to obtain two essentially continuous belt strips extending along two conveying directions substantially parallel to one another;

c) supplying, in a substantially continuous manner, said belt strips to at least one assembly drum;

d) superposing on said at least one assembly drum portions having a predetermined length of each of said belt strips, so as to obtain a belt structure comprising radially superposed portions of belt strips wherein said reinforcing cords are parallel to one another in each portion and inclined in opposite direction with respect to the cords of the adjacent portion.

In the following description and in the subsequent claims, the term "belt assembly" is used to indicate a semi-finished product essentially consisting of a rubber mixture sheet incorporating reinforcing cords inclined with respect to the longitudinal axis thereof and having a width substantially equal to that of the belt strips placed side by side.

In the following description and in the subsequent claims, the expression "in a substantially continuous manner" is used to indicate the absence of intermediate storages of the semi-finished products between the various manufacturing steps. These storages, as said, may change the chemical-physical and/or structural characteristics thereof in an undesired manner. As an example, the expression "to provide in a substantially continuous manner a belt assembly" is used to indicate that the belt assembly is produced and subsequently processed, i.e. cut, without the introduction of an intermediate storage between its production and its subsequent cutting.

Advantageously, thanks to the formation of the belt strips in a substantially continuous manner and immediately upstream of an assembly drum, the method of the present invention enables not only to improve the product quality and the process productivity, but also to reduce the size of the plant, the material wastes and the storage costs, as well as the material handling and labor costs with respect to the methods of the prior art.

Preferably, the method of the invention comprises the step of preparing, in a substantially continuous manner, a belt assembly by means of the following steps:

e) forming, in a substantially continuous manner, a sheet of rubber-coated fabric incorporating a plurality of reinforcing cords substantially parallel to one another;

f) transporting said sheet of rubber-coated fabric along a predetermined conveying direction;

g) cutting said sheet of rubber-coated fabric along a cutting direction forming a predetermined cutting angle with respect to the conveying direction of the sheet of rubber-coated fabric, so as to obtain a plurality of strips of predetermined prevailing length;

h) rotating each strip of an angle equal to said inclination angle of the reinforcing cords with respect to said direction;

i) butt splicing said rotated strips at an edge of prevailing length thereof, so as to form said belt assembly.

In this way, it is advantageously possible to provide, in a substantially continuous manner and without any labor intervention, the strips intended to be spliced to each other to continuously form the belt assembly, in turn intended to provide the belt strips.

According to a preferred embodiment of the invention, each strip is rotated with respect to the conveying direction of the sheet of rubber-coated fabric of an angle substantially equal to the cutting angle of said fabric.

In the following description and in the subsequent claims, the expression "prevailing length of a semi-finished product (strips, belt assembly, belt strips, portions of belt strips)" is used to indicate the dimension of the semi-finished product parallel to the laying direction of the cords incorporated within the semi-finished product.

Advantageously, the desired belt structure, comprising radially superposed portions of the belts strips, may be obtained according to the preferred method illustrated hereinbelow.

Preferably, the method of the invention comprises the formation, upstream of the assembly drum, of two belt strips substantially parallel to one another whose reinforcing cords have the same inclination with respect to the conveying direction of the belt assembly.

The superposing step of the portions of the belt strips obtained from the above-mentioned belt strips onto the assembly drum is carried out by tangentially feeding each portion of belt strip respectively one at the top and one at the bottom of the assembly drum, which is rotated in opposite directions during the winding of each portion of belt strip.

In a preferred embodiment of the invention, the superposing step of the portions of each belt strip on the assembly drum is carried out by means of a pair of assembly drums.

In this way, it is advantageously possible to increase the production rate of the plant for carrying out the method of the invention by reducing the time of each assembling cycle of the belt structure.

It should be observed that the portions of belt strips constituting the belt structure, once they have been superposed on one another on the assembly drum, have a different circumferential development. It follows that one of the belt strips, and precisely the one which is intended to form the radially outer portion of belt strip, is used more than the other one. In order to take account of such different use of the two beltstrips, it is convenient and preferable to discard, as a function of the material in excess detected by suitable sensors, portions of the belt strip intended to form the radially inner portions of belt strip. The amount of discarded material generated by said steps of the method of the invention (steps carried out in a substantially continuous manner and immediately upstream of the assembly drum) is however lower than the amount of discarded material normally generated by the production methods of the prior art and due to the aforementioned packing and mutual adhesion phenomena of the continuous belt strips wound on the storing spool.

Preferably, the portions of belt strips are obtained on respective conveying means for conveying the belt strips and the portions of belt strips, said conveying means being provided along the above-mentioned conveying direction of the belt assembly.

According to a preferred embodiment of the method of the invention, the portions of belt strips are supplied to said at least one assembly drum by means of said conveying means for conveying the belt strips and the belt strips portions.

In order to carry out the above-mentioned method, the present invention provides a plant for manufacturing a belt structure of a green tire for vehicles.

According to a preferred embodiment, the plant of the invention provides a splicing device of the strips, which operates substantially by applying pressure perpendicularly to the surface of the strips to be spliced.

Advantageously, such a device reduces almost to zero the damaging strains exercised in directions substantially parallel to the conveying direction of the strips; said strains may cause undesired deformations of the latter, in particular a localized variation of the density of the reinforcing cords.

In this embodiment, it is preferable to extrude the initial sheet of rubber-coated fabric incorporating the reinforcing cords in such a way as to provide the sheet with a lateral lip constituted by elastomeric material. In the subsequent operative steps of forming the strips starting from the initial sheet of rubber-coated fabric, said lip is positioned at one of the edges of prevailing length of the strips, preferably the trailing edge and defines a seat for receiving—by overlapping engagement—the edge having prevailing length, preferably the leading edge, of the following strip, with reference to the formation direction of the belt assembly by means of mutual splicing of the strips as they are obtained.

In this embodiment, the splicing device comprises a plate of suitable weight and size, movably supported above the conveying means for conveying the strips, which plate promotes—by pressing each strip—the adhesion by overlapping between the leading edge of the strip coming from the cutting device of the strips and the underlying lip associated to the trailing edge of the adjacent strip previously already incorporated in the belt assembly being formed. Moreover, the splicing device enhances the butt union between said edges with reference to an operative condition of the plant at full production rate.

Alternatively, the splicing device may comprise a plurality of counter-rotating upper and lower rolls supported above and, respectively, below the conveying means for conveying the strips, said rolls being movable along a direction parallel to the sides of the strips to be spliced.

Alternatively, the splicing device may be of the comb-type, i.e. including a plurality of jaws adapted to grasp the edges of the adjacent strips in order to carry out the butt splicing thereof at their edges having prevailing length.

Advantageously, the plant and the method of the invention enable the preparation of a belt structure of a green tire in a totally automated manner, limiting as much as possible the labor involved and without any need to store the semi-finished products, which are advantageously produced immediately before being assembled together to form the belt structure.

Advantageously, with the plant and the method of the invention, the risks of quality variations of the belt structure related to possible variations of the chemical-physical characteristics of the semi-finished products and/or related to a variation of temperature and/or humidity of the warehouse or to a long permanence of the semi-finished products on the spools are also reduced to a minimum or substantially eliminated.

In a preferred embodiment, the plant of the invention is provided with an extrusion apparatus comprising an extrusion head adapted to supply in a substantially continuous manner a substantially continuous sheet of rubber-coated fabric incorporating a plurality of reinforcing cords, said plurality of reinforcing cords being supplied by a creel supported upstream of said extrusion head.

Downstream of said extrusion apparatus, the plant according to the invention comprises a first cutting device operating on said sheet of rubber-coated fabric leaving the extrusion apparatus so as to obtain a plurality of strips from this sheet.

The plant of the invention also comprises a transfer device of the strips adapted to move the strips away from the cutting position, at which the strips are obtained from the sheet of rubber-coated fabric, towards a releasing position, at which the strips are parallel to one another and arranged side by side along an edge of prevailing length.

Preferably, said transfer device of the strips includes means for moving away the strips and at least one positioning device for positioning the strips.

Advantageously, thanks to said features, the plant lay-out turns out to be independent from the cutting angle of the strips, so that a reduction in the area occupied by the plant is achieved with respect to the plants of traditional type; furthermore, even the strips pickup turns out to be independent from the cutting operation, thus maximizing the plant flexibility.

An additional advantage achieved by the invention and related to the increase of the production flexibility, consists in the reduction of the time required to shift to a production of belt strips for tires of different size, the operations required being limited—if it is not required to change the type of cord and/or the type of rubber mixture—only to the variation of the cutting angle of the sheet of rubber-coated fabric and/or to the cutting of strips of a different prevailing length.

Furthermore, with respect to the prior art systems based on the use of continuous belt strips provided and packed on spools, it is not necessary to store and handle the spools as well as the various supporting fabrics used, such as the sheets of release material (for example polyester or polyethylene) coupled to the belt strip before carrying out its winding on the spool.

In a preferred embodiment, the means for moving away the strips comprises conveying means for conveying the strips, for example a conveyor belt or any other means having the same function, having a conveying axis substantially parallel to the cutting direction of the sheet of rubber-coated fabric and being movable between the receiving position of the strip arranged downstream the first cutting device of the sheet of rubber-coated fabric and the pickup position of the strips.

Preferably, the plant of the invention further comprises a catching device for catching the sheet of rubber-coated fabric, adapted to transport the free end of said sheet past the first cutting device and cooperating with said transfer device of the strips.

In a preferred embodiment, the positioning device for positioning the strips, adapted to transport the strips from the pickup position, provided downstream of the cutting device of the sheet of rubber-coated fabric, towards the releasing position, provided upstream of the butt splicing device of the strips, comprises a catching device for catching the strips rotatably mounted about an axis perpendicular to the strip surface in such a way as to rotate each strip of an angle equal to the inclination angle of the reinforcing cords with respect to the conveying direction of the sheet of rubber-coated fabric.

Preferably, the catching device for catching the strips (which is part of the positioning device) is mounted on a supporting frame movably guided to and from the strip to be picked-up and positioned.

Even more preferably, the catching device for catching the strips comprises a plate which operates along a direction parallel to the upper surface of the strip, therefore avoiding the creation of undesired stresses in the material constituting the strip, such as the stresses produced when the strip is handled by grasping the same by its edges with subsequent undesired strains, especially in directions substantially parallel to its conveying direction. Such strains may in fact cause undesired deformations of the strips, in particular a localized variation of the density of the reinforcing cords.

According to a further aspect thereof, the invention provides a method for manufacturing a belt package of a green tire for vehicles.

In an embodiment thereof, the width of the additional layer incorporating the zero degree reinforcing cords is substantially equal to the width of the belt structure, whereas its length is at least equal to the circumferential development of the assembly drum. Preferably such length is equal to twice the circumferential development of the assembly drum.

In a preferred embodiment, the additional layer incorporating the zero degree reinforcing cords is formed by spirally winding around the belt structure at least one relatively narrow ribbon of rubber mixture, subsequently referred to as: tape, incorporating one or more reinforcing cords. Conveniently, this tape is wound in such a way as to obtain spires axially placed side by side circumferentially extending around the belt structure substantially for the entire width of the latter.

For the implementation of the above-mentioned method for manufacturing a belt package of a green tire for vehicles, the invention provides a plant.

Preferably, the plant for manufacturing the belt package is provided with an extrusion apparatus, including an extrusion head, adapted to form in a substantially continuous manner the ribbon (or tape) of rubber mixture incorporating the zero degree reinforcing cords.

According to a further aspect thereof, the invention provides a method for manufacturing a crown structure of a green tire for vehicles.

In a preferred embodiment, the tread is fed in a substantially continuous manner to said assembly drum.

In order to carry out the above-mentioned method for manufacturing the crown structure of a green tire for vehicles, the invention also provides a plant.

According to the invention, such plant comprises an extrusion apparatus for supplying a continuous ribbon of rubber mixture from which the treads required for the formation of the crown structure are produced, as well as conveying means for conveying the continuous ribbon towards an assembly drum, on which the previously formed belt package is supported.

Advantageously, after the application of the tread onto the belt package, means adapted to exercise a suitable pressure onto the tread is used in order to increase the adhesion thereof onto the underlying belt package and to strengthen its assembling. Preferably, the above-mentioned conveying means for conveying the continuous ribbon of rubber mixture is provided with cooling means, for example a set of serpentine tubes, in which cold water circulates.

BRIEF DESCRIPTION OF THE DRAWINGS

Additional features and advantages of the invention will become more readily apparent from the description of some embodiments of a method for manufacturing a belt structure, a belt package and a crown structure of a green tire according to the invention, made with reference to the attached drawing figures in which, for illustrative and non limiting purposes, a plant for carrying out said method is shown.

In the drawings:

FIG. 11 is an elevational view of a device for supporting and angularly positioning the assembly drums of FIG. 8.

DETAILED DESCRIPTION OF SOME PREFERRED EMBODIMENTS

Figure 1:
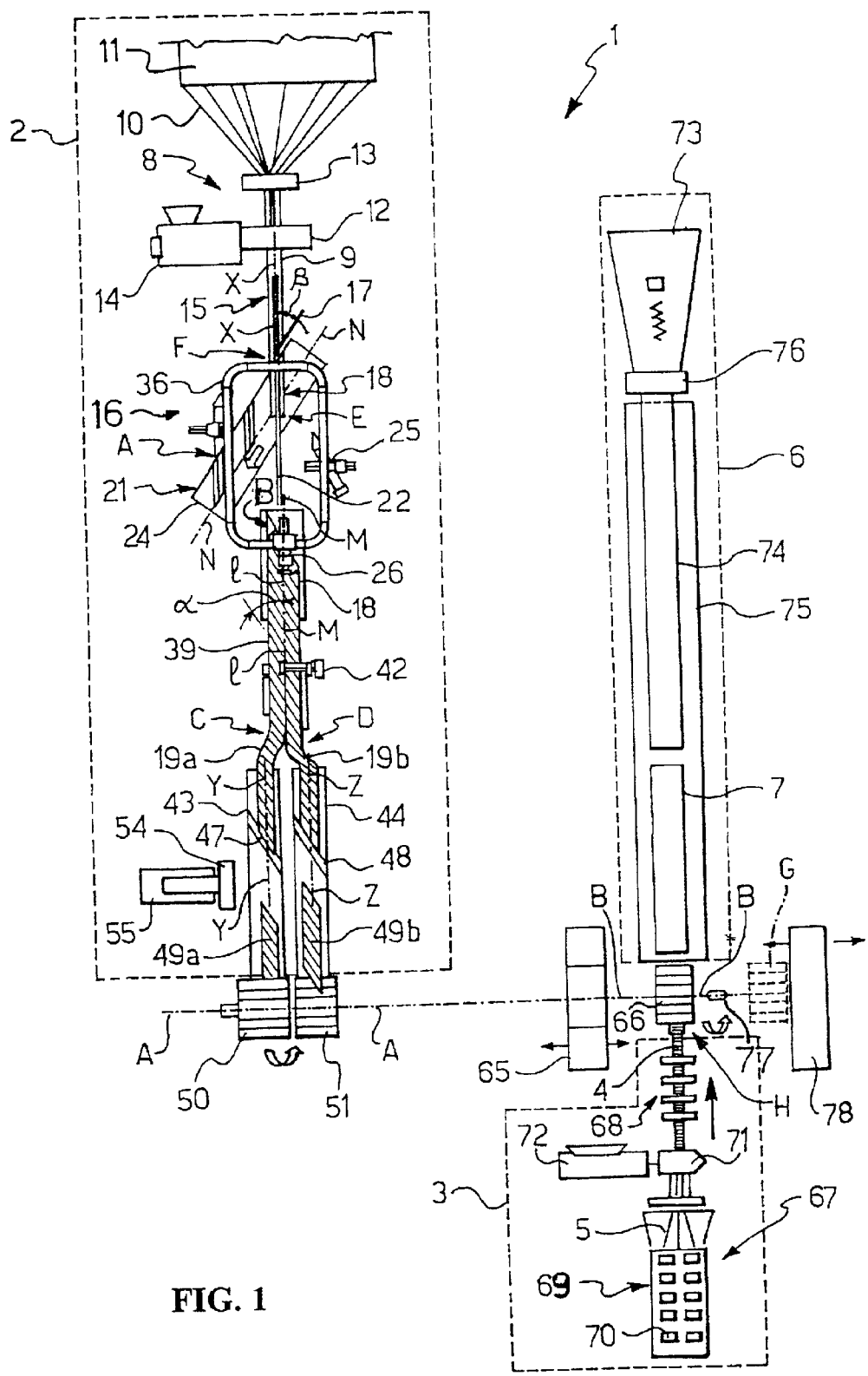
FIG. 1 schematically illustrates a plant for manufacturing a crown structure according to the present invention.
Figure 2:
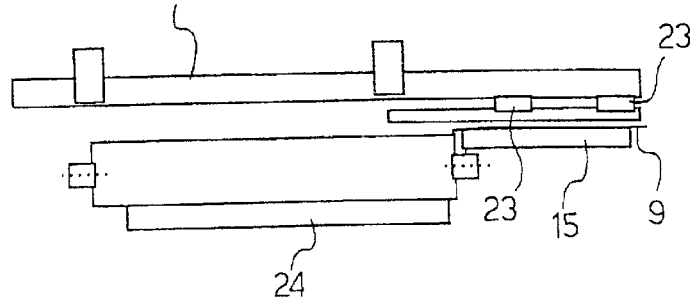
FIGS. 2 and 3 are schematic side elevational views of respective operative conditions of a catching device (FIG. 2) and cutting means (FIG. 3) for catching and, respectively, cutting a sheet of rubber-coated fabric provided upstream of and cooperating with the transfer device of the strips making part of the plant of FIG. 1.

With reference to the schematic lay-out of FIG. 1, a plant according to the invention for manufacturing, in a substantially continuous manner, a crown structure of a green tire for vehicles is generally indicated at 1. The plant 1 comprises a plant 2 for manufacturing, in a substantially continuous manner, a belt structure, a production line 3 for manufacturing, in a substantially continuous manner, a rubber mixture ribbon 4 of limited width comprising a plurality of reinforcing cords 5 (the above-mentioned tape) and a production line 6 for manufacturing, in a substantially continuous manner, a tread 7.

In the illustrated example, the plant 2 comprises an extrusion apparatus 8, intended for forming, in substantially continuous manner, a sheet 9 of rubber-coated fabric incorporating a plurality of reinforcing cords 10 substantially parallel to one another. The extrusion apparatus 8 is fed by a creel 11 which supplies the cords 10, made of a suitable reinforcing material, for example metal cords, to an extrusion head 12 positioned downstream of the creel 11 and provided with a comb-type device 13 which sets the coplanarity and the parallelism of the cords 10; additionally, the extrusion head 12 is fed by a rubber mixture of suitable composition by means of an extruder 14, conventional per se.

Immediately downstream of the extrusion head 12, conveying means 15 for conveying the sheet 9 of rubber-coated fabric is provided, for example constituted by a conveyor belt, such as illustrated in the drawings. Such conveying means 15 for conveying the sheet 9 of rubber-coated fabric convey the sheet 9 along a predetermined conveying direction X—X towards a strip transfer device, generally indicated at 16, which will be described in greater detail in the following.

The conveying means 15 for conveying the sheet 9 of rubber-coated fabric may be constituted, in addition to conveyor belts, also by rolls, mobile tables or any other means known in the art and adapted for the intended purpose.

Figure 3:
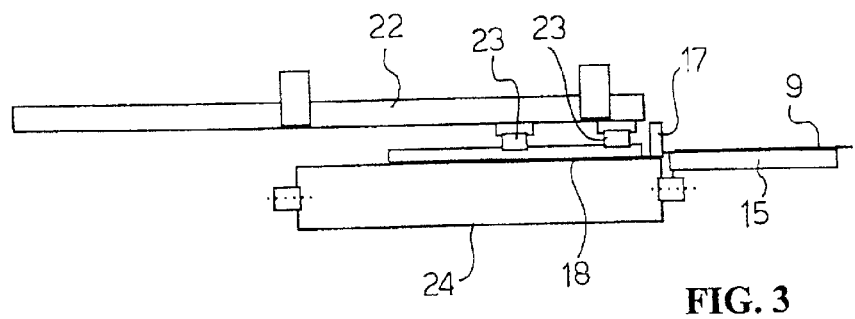
Figure 4:
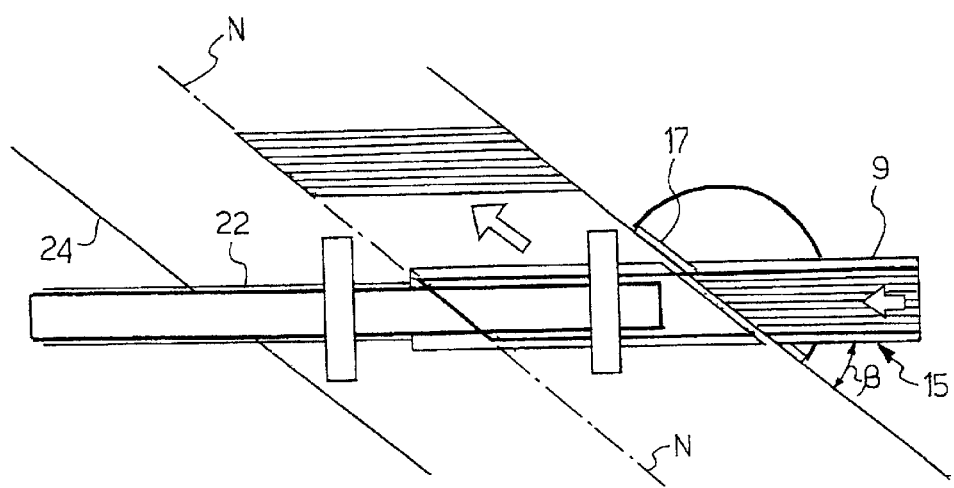
FIG. 4 is a schematic top view of the catching device and of the cutting means illustrated in FIGS. 2 and 3.

A first cutting device 17, schematically shown in FIGS. 1, 3 and 4, is provided upstream of the strip transfer device 16 for cutting, in a cutting position F, the sheet 9 of rubber-coated fabric along a cutting direction forming a predetermined angle D with respect to the above-mentioned conveying direction X—X, so as to obtain a sequence of strips 18 having a predetermined length. In order to simplify the comprehension of the following description, such length will be indicated as "prevailing length" of the strip 18.

Preferably, said angle β is comprised between 18° and 30° depending upon the size and the type of performance of the tire to be produced.

Figure 6:
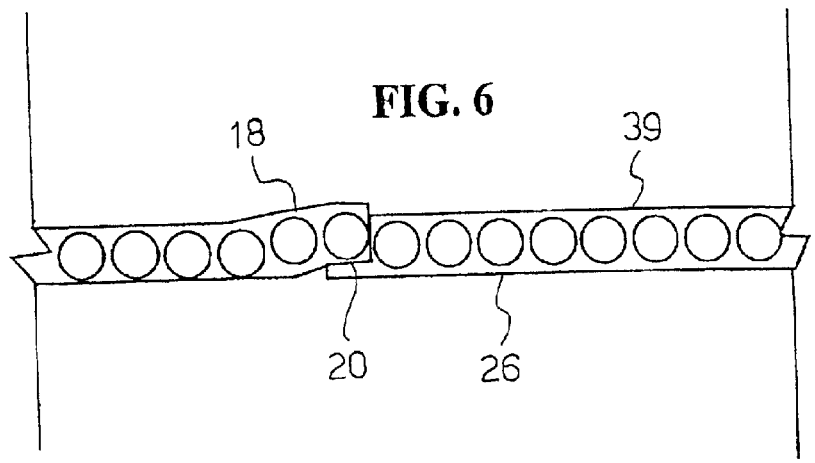
FIG. 6 is a schematic partial view, in enlarged scale, of the belt assembly, illustrating the splicing between adjacent strips at a lip extending from one of them.
Figure 7:
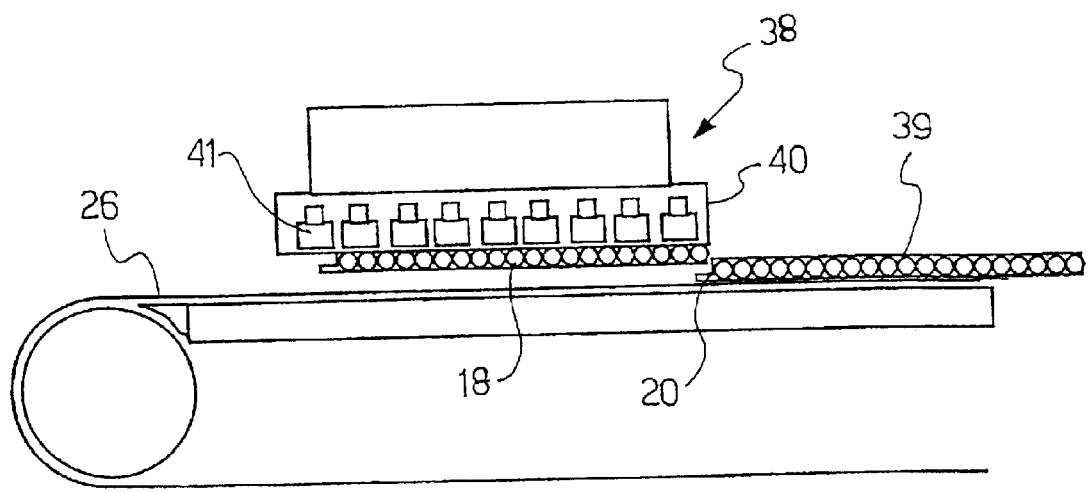
FIG. 7 is an elevational view of a preferred embodiment of a splicing device of the strips and of the conveying means for conveying the strips and the belt assembly obtained by splicing said strips.

In a preferred embodiment and for the purpose of promoting the reciprocal splicing of the strips 18 in order to form a belt assembly 39, the extrusion head 12 is provided with a suitably shaped die such as to form a sheet 9 of rubber-coated fabric laterally provided with a lip 20, exclusively made of the fabric rubber mixture and having a suitable width (FIGS. 6, 7).

Conveniently, after the above-mentioned cutting operation, strips 18 are obtained from the sheet 9 of rubber-coated fabric, said strips 18 being provided with the above-mentioned lateral lip 20 on one of the two edges of prevailing length.

The strips transfer device 16 essentially has the function of transferring the strips 18, obtained by cutting the sheet 9 of rubber-coated fabric, from a cutting position F to a releasing position B, at which the strips 18 are consecutively arranged in parallel to one another, side by side, along an edge of prevailing length thereof.

Preferably, downstream of the releasing position B, the reinforcing cords 10, arranged parallel to each other, form an angle a substantially equal to the cutting angle β of the sheet 9 of rubber-coated fabric with respect to the conveying direction of the strips 18 (which in this case advantageously coincides with direction X—X with an ensuing reduction of the overall size of the plant 2).

In a preferred embodiment, the plant 2 comprises a catching device 22 for catching the sheet 9 of rubber-coated fabric, in the illustrated example constituted by a mobile plate parallel to the conveyor belt 15 and provided with magnets 23, adapted to drag the sheet 9 of rubber-coated fabric past the first cutting device 17 for a portion having a length equal to the prevailing length of the strip 18 to be produced, at a receiving position E. The receiving position E of the strips 18 lays therefore downstream of the first cutting device 17 along the conveying direction X—X of the sheet 9 of rubber-coated fabric.

The catching device 22 for catching the sheet 9 of rubber-coated fabric may include, instead of the magnets 23, suitable means adapted to hold the sheet material, such as a plurality of suction cups connected to a vacuum pump, particularly suitable when the cords 10 are made of a non-magnetic material, for example textile fiber.

In the following description, for illustrative and non limiting purposes, a catching device of the magnetic type will be described.

In the embodiment illustrated, the strips transfer device 16 comprises means, generally indicated at 21, for moving each strip 18 away from the cutting position F and place it in a pickup position A, away from said direction X—X, adapted to allow in an easy way the following operations provided for the preparation of the belt structure.

The means 21 for moving away the strips 18 comprises conveying means for conveying the strips 18, for example a conveyor belt 24, having a conveying axis N—N parallel to the cutting direction of the sheet 9 of rubber-coated fabric, which conveys the strip 18 from the receiving position E to the pickup position A, away from direction X—X.

The strips transfer device 16 further comprises at least a positioning device 25 of the strips 18, for picking each strip 18 up from the above-mentioned pickup position A and placing the same in the releasing position B.

In other words, the positioning device 25 of the strips 18 picks each strip 18 up from the pickup position A on the belt 24, rotates, if needed, the strip 18 of a predetermined angle α with respect to the conveying direction X—X of the sheet 9 of rubber-coated fabric and places the strip 18 in a suitable position B for its further treatment as will be better clear in the following.

In this preferred embodiment, the positioning device 25 of the strips 18 is provided with means adapted to pick up, rotate and transfer the strip 18 in the position B onto conveying means 26 for conveying the strips 18 and the belt assembly 39, such as a conveyor belt, belonging to said strips transfer device 16 and having a conveying axis M—M substantially parallel to the initial conveying direction X—X.

Figure 5:
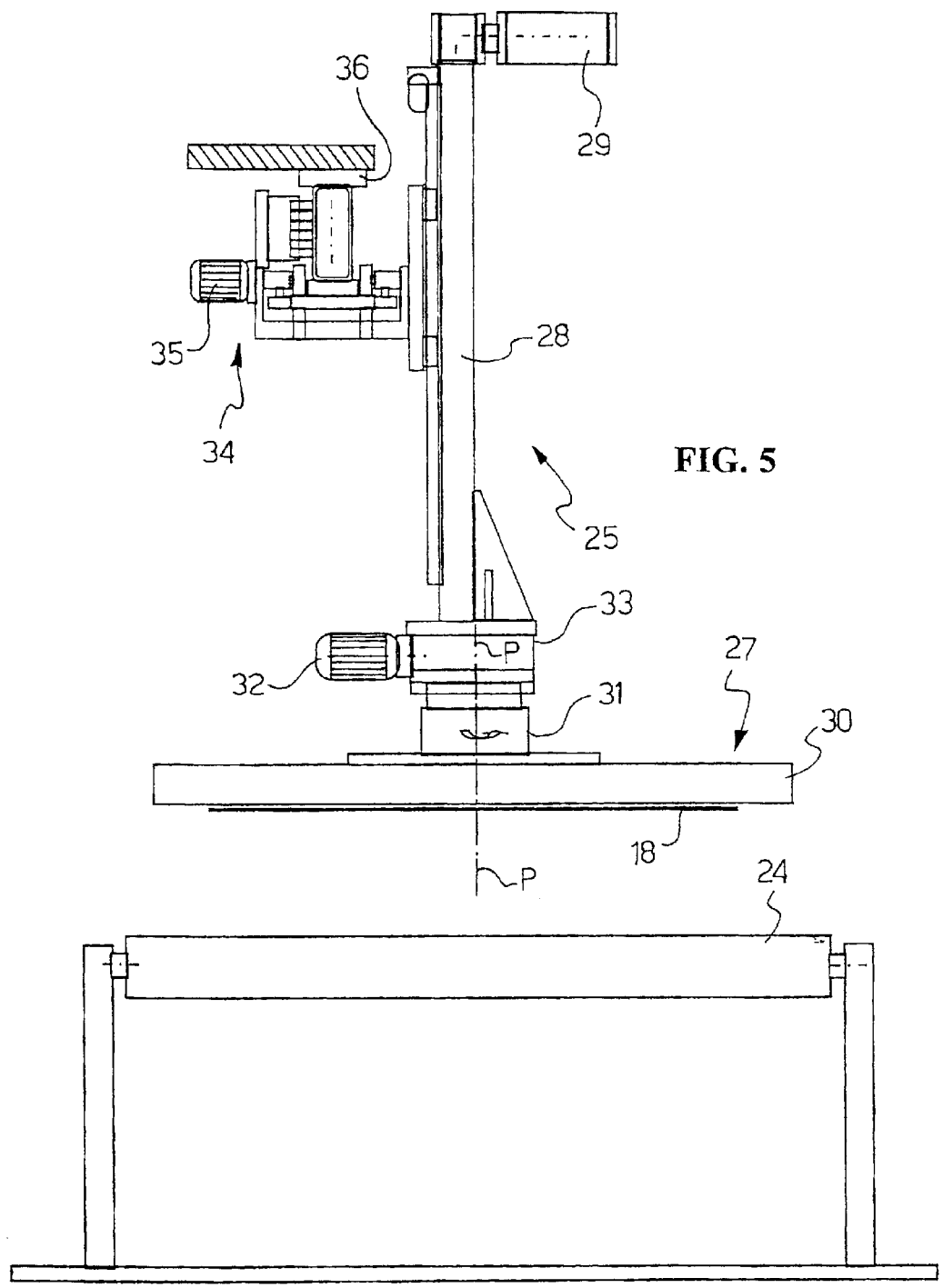
FIG. 5 is an elevational view of a positioning device for positioning the strips and of the conveying means for conveying the strips making part of the plant of FIG. 1.

More particularly, the positioning device 25 of the strips 18 comprises a catching device 27 for catching the strips 18 which is rotatably mounted on a supporting frame 28 movably guided to and from the conveyor belt 24 and driven by a respective motor 29. In the example illustrated in FIG. 5, the catching device 27 for catching the strips 18 is constituted by a plate 30, for example of magnetic type, rotatably mounted on a supporting beam 31. The supporting beam 31 and the catching device 27 rotatably mounted thereon are rotated about an axis P—P by a motor 32 placed on a support 33 fixed to the frame 28.

The frame 28 is in turn associated to a supporting trolley 34 driven by a respective motor 35 along an overhead track 36, forming a closed loop and supported in a manner conventional per se above the conveyor belt 24 and the conveying means 26 for conveying the strips 18 and the belt assembly 39.

In this way, the positioning device 25 of the strips 18 may move along a closed loop-shaped circuit and may be transferred from the pickup position A of the strips 18 to the releasing position B of the strips 18 on the conveyor belt 26 for their further processing as will be described further on.

In a preferred embodiment of the invention and as illustrated in FIG. 1, a plurality of positioning devices 25 of the strips 18 may be provided, advantageously increasing the production capacity of the plant 1.

In the illustrated example, and as already mentioned, a same positioning device 25 of the strips 18 advantageously both rotates the strips 18 at least in their lying plane, and places the strips 18 on the conveyor belt 26, or on any other suitable conveying means for conveying the strips 18 and the belt assembly 39.

In a preferred embodiment, the conveyor belt 26 is positioned immediately downstream of and in substantial alignment with the conveyor belt 15 of the starting sheet 9 of rubber-coated fabric with an advantageous size reduction of the plant 2.

By virtue of the action of the strips transfer device 16, a plurality of strips 18 aligned to one another is therefore provided in a substantially continuous manner on the conveyor belt 26, such strips 18 incorporating reinforcing cords 10 substantially parallel to each other and inclined of an angle α with respect to the conveying direction M—M of the conveyor belt 26.

As illustrated in FIG. 7, the plant 2 comprises a splicing device 38 of the strips 18 previously positioned by the positioning device 25 of the strips 18 along said conveyor belt 26.

The splicing device 38 is movably supported above the conveyor belt 26 and enables to obtain, by consecutively splicing the aligned strips 18, a belt assembly 39 the cutting of which allows to obtain respective belt strips 19a, 19b extending along two conveying directions Y—Y, Z—Z substantially parallel to each other. Preferably, the directions Y—Y and Z—Z are parallel to the conveying direction M—M of the conveyor belt 26.

In the embodiment illustrated in FIG. 7, the splicing device 38 of the strips 18 comprises a plate 40, of suitable size and weight, movably supported above the conveyor belt 26. The plate 40 picks each strip 18 up by means of a plurality of magnets 41 and places it at the free end of the belt assembly 39 being formed on the conveyor belt 26.

Advantageously, at one of its edges of prevailing length, each strip 18 is provided with a lip 20 (FIG. 6) only made of elastomeric material and having a suitable width, for example of about 2 mm. In this embodiment, therefore, a seat for receiving—by overlapping—one edge of an adjacent strip 18 is defined above the lip 20. Such lip promotes, therefore, the splicing of the strips 18 with the formation in a substantially continuous manner of the belt assembly 39. The splicing is carried out by the plate 40 which, by pressing on the entire upper surface of each strip 18 to be spliced, promotes the engagement and the union by pressure of the edge of the strip 18 with the lip 20 of the belt assembly 39 being formed, thereby accomplishing also the butt splicing between the trailing edge of the belt assembly 39 and the leading edge of the new strip 18.

In a preferred embodiment and as illustrated in FIG. 1, downstream of the conveyor belt 26 a second cutting device 42 is provided, adapted to cut the belt assembly 39 along the longitudinal axis l—l thereof, so as to obtain two distinct belt strips 19a and 19b.

The cutting device 42 is not illustrated in its constructive details as it is of known type. Preferably it comprises a system having two counter-rotating disks, peripherally provided with a cutting edge, known in the field with the term of "slitter".

Downstream of the cutting device 42, conveying means for conveying the belt strips 19a, 19b and the portions of belt strips 19a, 19b are provided, for example two conveyor belts 43 and 44, which convey the belt strips 19a and 19b obtained in this manner along the above-mentioned conveying directions Y—Y and Z—Z, in the illustrated example parallel to the conveying direction X—X of the starting sheet 9 of rubber-coated fabric.

Figure 8:
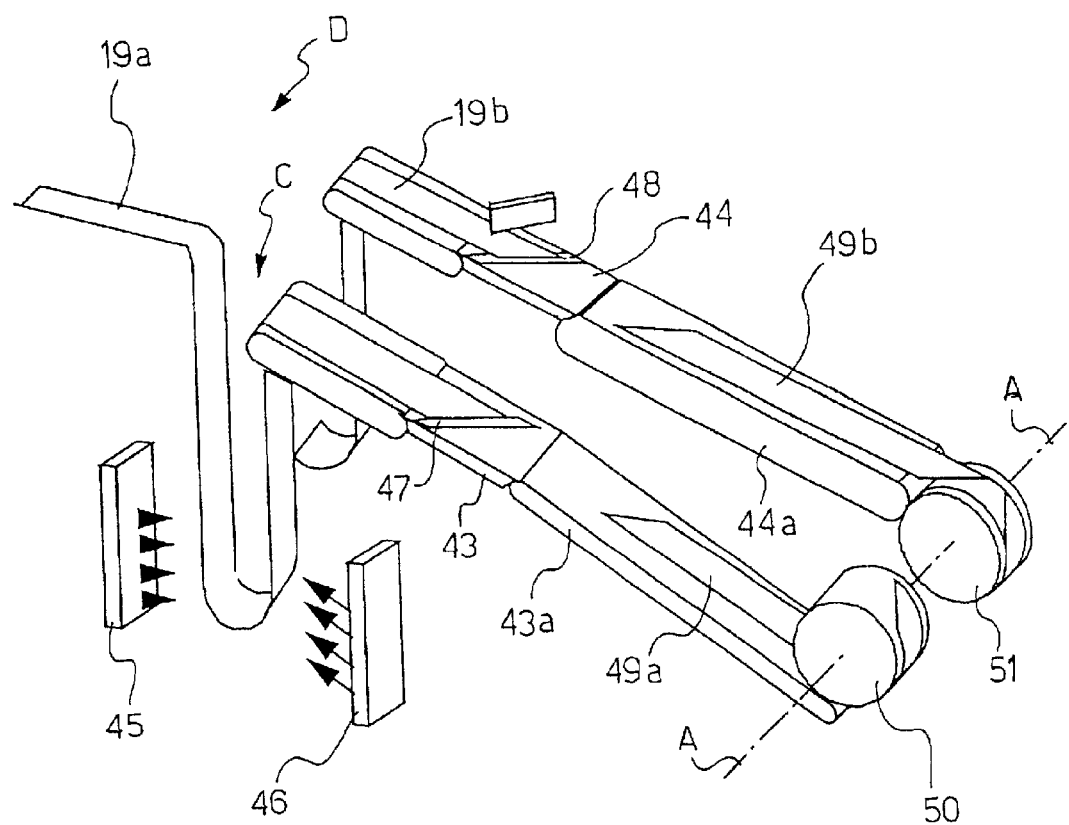
FIG. 8 is a schematic perspective view of a pair of assembly drums and of the conveying and cutting means of the belt strips and of the portions of belt strips thus obtained.
Figure 9:
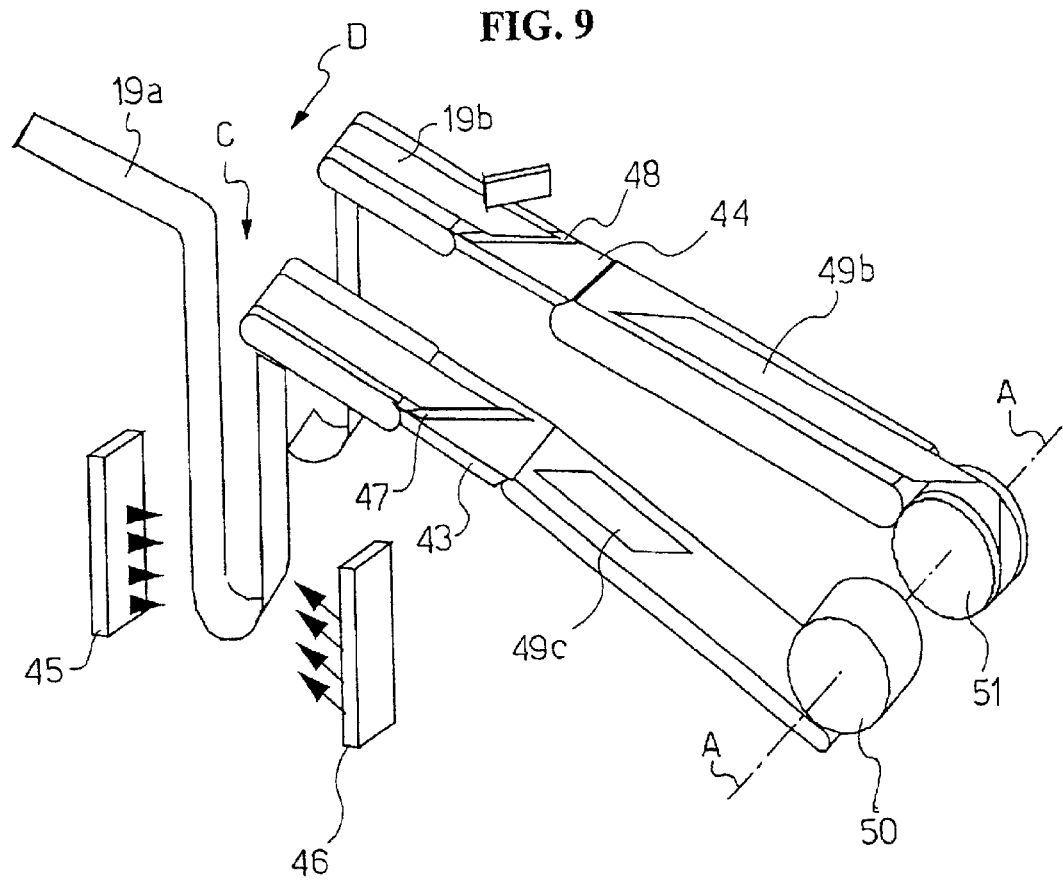
FIG. 9 is a schematic perspective view of the devices of FIG. 8, illustrating the formation of a portion of belt strip in excess.

In a preferred embodiment and as illustrated in FIGS. 8 and 9, each conveyor belt 43, 44 is positioned at a predetermined distance with respect to the second cutting device 42, in such a way as to form respective spaces C, D adapted to contain a portion of predetermined length of each of the belt strips 19a, 19b, known in the field with the term of "festoon".

More particularly, the festoon formed by the belt strips 19a and 19b carries out the advantageous function of storage unit adapted to absorb any possible different processing rate and/or use rate of the semi-finished products upstream and downstream of the conveyor belts 43 and 44.

In this embodiment, and in order to detect the length of the above-mentioned festoons, the plant 1 of the invention advantageously comprises a plurality of sensors suitably positioned at the spaces C, D.

In FIG. 9, the sensors 45 and 46 intended for controlling the length of the festoon formed by the belt strip 19a in space C can be seen.

Third cutting devices, schematically indicated at 47 and 48 in FIGS. 8 and 9, are positioned along the conveyor belts 43 and 44 downstream of the spaces C and D for cutting the belt strips 19a, 19b along a direction substantially parallel to that of the reinforcing cords 10, thereby forming portions 49a and 49b of predetermined length of the above-mentioned belt strips 19a, 19b.

In the illustrated example, each of the third cutting devices 47 and 48 comprises a shearer of conventional type.

Advantageously, the sensors 45 and 46 control the length of the festoon in the space C between a minimum value adapted to ensure the preparation, in a continuous manner, of the belt strip 19a and a maximum value above which the sensors activate a suitable pickup device 54, described in greater detail in the following, having the function of discarding portions of belt strip in such a way as to maintain the festoon length within said limit values.

Additionally, the plant 1 comprises a pair of assembly drums 50, 51, supported immediately downstream of the conveyor belts 43 and 44 and intended to carry out the actual manufacturing step of the belt structure starting from the portions 49a and 49b of the belt strips 19a, 19b thus formed on the conveyor belts 43 and 44.

The drums 50 and 51 are coaxially aligned along a rotation axis A—A and are placed on diametrically opposite sides of a device 52 for supporting and angularly positioning the assembly drums 50, 51 which is driven by a respective independent motor 53 (FIG. 11).

Advantageously and as will be better apparent in the following, the device 52 switches the drums 50 and 51 with one another at the end of each assembling operation carried out thereon, in order to sensibly reduce the assembling cycle time of the belt structure.

In this embodiment, the belt structure is preferably initiated on the drum which is arranged at the conveyor belt 43

(at position V) and completed on the same drum, shifted at the conveyor belt 44 (at position W), as it can be seen in FIG. 11.

In this way, the belt strips 19a, 19b are respectively used to form the respective radially inner and outer portions of the belt structure.

As will be described in greater detail in the following, in order for the belt structure to have, upon completion of the assembling, the two portions 49a, 49b of belt strips 19a, 19b superposed in such a way as to confer to the reinforcing cords 10 an inclination in an opposite direction in each portion of belt strip, it is convenient to differentiate the way each portion 49a, 49b of belt strip 19a, 19b is fed to the respective assembly drums 50, 51. To this end, in the embodiment illustrated in FIG. 8, the conveyor belt 44 is provided with an end section 44a positioned at the same level of the upper part of the assembly drum 51, whereas the conveyor belt 43 is provided with a suitably inclined end section 43a so as to lie close to the lower part of the assembly drum 50.

Figure 10:
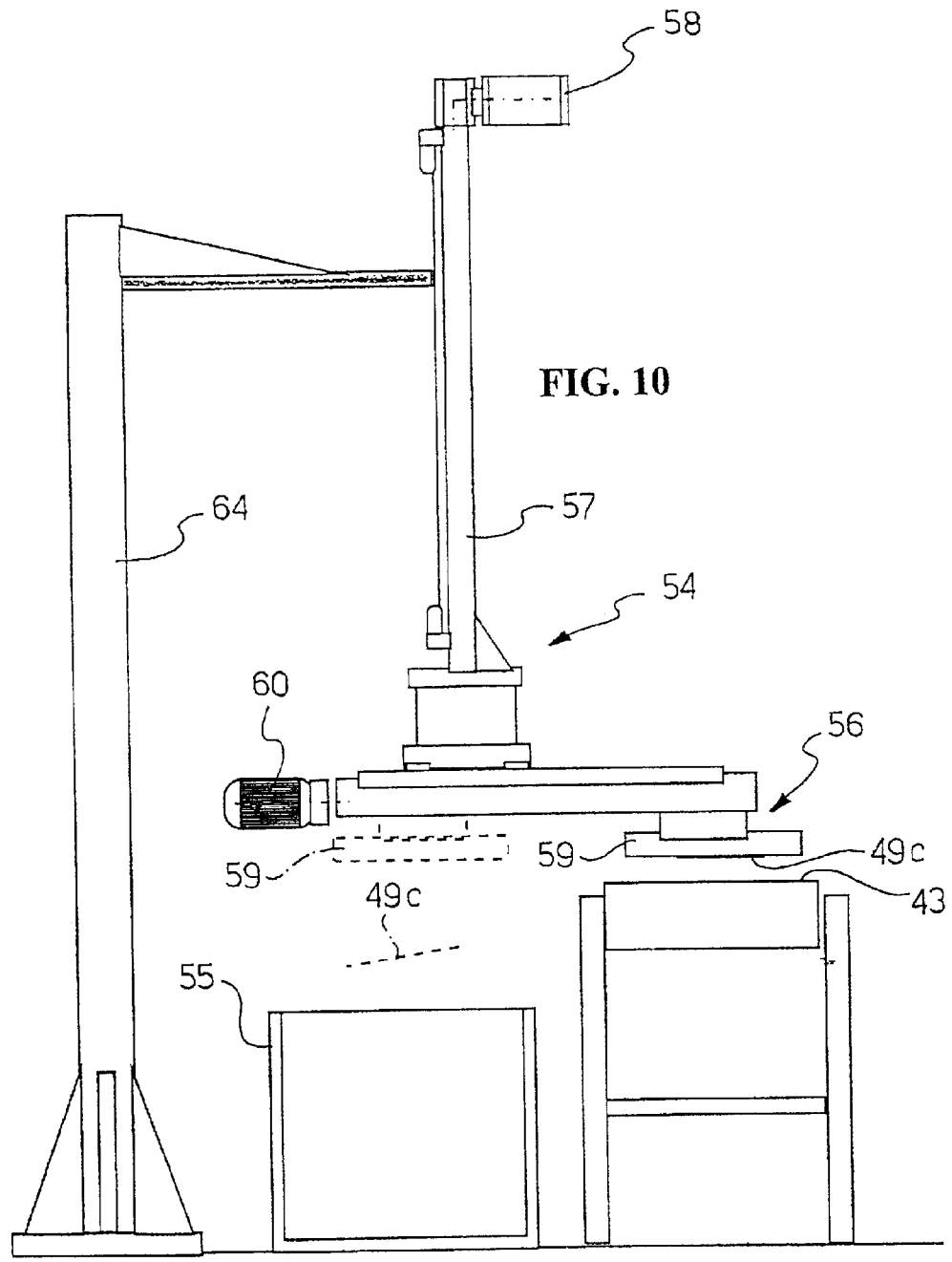
FIG. 10 is a schematic side elevational view of a pickup device of the portions of belt strips in excess and of the conveying means of FIG. 8, illustrating the discarding operation of the portion of belt strip in excess of FIG. 9.

According to the preferred embodiment illustrated in FIG. 10, a pickup device 54 adapted to pick up and discard at predetermined time ranges a portion of belt strip is provided beside the conveyor belt 43 so as to compensate any excess of belt strip deriving from the different consumption of the belt strips 19a, 19b by virtue of the different circumferential development of the two portions 49a, 49b thereof, once the latter are assembled onto one of the assembly drums 50, 51.

In the embodiment illustrated in FIGS. 9 and 10, such excess portion of belt strip, indicated at 49c, lies on the conveyor belt 43 and constitutes the strip portion arranged in the radially inner position in the tire belt structure.

Such pickup device 54 has the function of picking up the strip portion 49c in excess, preferably coinciding with an entire strip portion, from the conveyor belt 43 and discarding the same into an appropriate collecting container 55, arranged out of line.

In the embodiment illustrated in FIG. 10, the pickup device 54 is provided with means adapted to pick up, transfer and release in the container 55 the strip portion 49c in excess. In particular, the pickup device 54 comprises a catching device 56 which is supported by a supporting frame 57 movably driven, in the vertical direction, along a beam 64 by a respective motor 58 to and from the conveyor belt 43.

In the example illustrated in FIG. 10, the catching device 56 comprises a magnetic plate 59 driven, in the horizontal direction, to and from the conveyor belt 43 by a respective motor 60.

As mentioned above, the above-mentioned plant 2 intended for preparing the belt structure of the green tire cooperates within the plant 1 with the production line 3 intended for preparing the tape 4 incorporating the reinforcing cords 5 and with the production line 6 intended for preparing the tread 7 so as to produce, respectively, the belt package and the crown structure of the green tire.

To this end and as illustrated in FIG. 1, the plant 1 comprises a first transfer device 65, known per se and from now on indicated as Transfer Ring, adapted to transfer the belt structure produced in the plant 2 from the above-mentioned assembling position on a third assembly drum 66 on which the crown structure is assembled.

Preferably, the assembly drum 66 has a rotation axis B—B substantially aligned with the rotation axis A—A of the drums 50 and 51 in order to reduce the overall size of the plant 1 and to facilitate the transfer operations of the belt structure.

Advantageously, the production line 3 of the tape 4 and the production line 6 of the tread 7 are positioned in the plant 1 near the assembly drum 66, so as to avoid any transferring operation of said semi-finished products 4, 7.

The production line 3 of the tape 4 essentially comprises an extrusion apparatus 67, adapted to form, in a substantially continuous manner, a narrow ribbon 4 (the tape) of rubber mixture incorporating a plurality of reinforcing cords 5, preferably in a number comprised between 3 and 15, as well as means to guide the tape thus produced towards the assembly drum 66, such as a set of rolls 68. As an alternative, the tape may be wound around cylinders cooled by means of inner circulation of a suitable coolant.

The extrusion apparatus 67 is fed by a creel 69 provided with a plurality of spools, all indicated at 70, which supplies the cords 5 to an extrusion head 71 fed with a rubber mixture of suitable composition by means of an extruder 72, conventional per se.

Conveniently, the cords 5 are made of a suitable reinforcing material made of textile, such as polyamide, or of metal.

The assembly drum 66 is preferably equipped with means, conventional per se and not shown, intended to facilitate the winding in a spiral fashion of the tape 4 around the belt structure already prepared on the drum 66 (said means consisting, for example, of one or more pressing rolls) and to cut the tape 4 once the latter has formed the reinforcing layer including the zero degree cords 5.

In an illustrative embodiment, this cutting means may consist of a pneumatic cutting mechanism of the shear type, known per se.

The production line 6 of the tread 7 comprises an apparatus 73, adapted to extrude or form, in a substantially continuous manner, a tread sheet 74 of rubber mixture intended to constitute the tread 7, as well as means for conveying the continuous tread sheet 74 towards the assembly drum 66, such as a conveyor belt 75.

The apparatus 73, which in the illustrated example includes an extrusion screw and an extrusion head 76 of conventional type, only schematically represented, is fed by a rubber mixture of suitable composition.

Preferably, the conveyor belt 75 is provided with suitable cooling means, such as a set of serpentine tubes, through which cold water circulates, adapted to cool the continuous tread sheet 74 from the temperature the sheet has when it leaves the extrusion or forming head (generally equal to approximately 80° C.) down to a temperature suitable for carrying out the subsequent processing of the tread sheet 74 (conveniently in the order of approximately 40–45° C.).

Cutting means, conventional per se and not shown, are also provided along the conveyor belt 75, for cutting the continuous tread sheet 74 in portions having a predetermined length corresponding to the circumferential development of the tread of the tire being manufactured.

In this way, it is possible to obtain a set of treads 7 (illustrated in FIG. 1) aligned along the conveyor belt 75 immediately upstream of the assembly drum 66.

In an alternative embodiment of the method of the invention, each tread 7 may be cut from the continuous tread sheet 74 after the winding operations around the assembly drum 66 by means of other conventional per se and not shown cutting means.

Similarly to what has been indicated above with reference to the tape 4, the assembly drum 66 is preferably equipped with means, conventional per se and not shown, adapted to facilitate the application of each tread 7 as a crown around the reinforcing layer including the zero degree cords 5.

As an example, said means may consist of one or more pressing rolls acting on the tread 7.

Finally, the plant 1 includes a positioning device 77 for positioning the assembly drum 66, adapted to move the drum by rotating the same of 180° about a vertical axis perpendicular to the rotation axis B—B of the drum 66, from an assembling position (indicated at H in FIG. 1) of the crown structure, to a pickup position (indicated at G in FIG. 1, wherein the drum 66 is indicated by a dotted line) of said structure by a second Transfer Ring 78.

This second Transfer Ring 78 transfers the crown structure towards a so-called first phase assembling line, not represented, on which line the cylindrical carcass sleeve adapted to be torically shaped and assembled with the crown structure is prepared.

With reference to the above-mentioned plant, a first embodiment of the method according to the invention for manufacturing a belt structure of a green tire comprises the following steps.

In a first step, the sheet 9 of rubber-coated fabric incorporating the reinforcing cords 10 and longitudinally provided with a lip 20 is formed in a substantially continuous manner by means of the extrusion apparatus 8. Such sheet 9 of rubber-coated fabric—once it has left the extrusion head 12—is transported by the conveyor belt 15 towards the strips transfer device 16 along the conveying direction X—X.

In a subsequent step and immediately upstream of the strips transfer device 16, the sheet 9 of rubber-coated fabric is picked up by the catching device 22 which drags the sheet 9 and places the same onto the conveyor belt 24, which in this step is not active. Subsequently, the first cutting device 17 carries out the cutting of the sheet 9 of rubber-coated fabric along a direction forming the predetermined angle $\beta$ (for example equal to about 30°) with respect to the conveying direction X—X, in order to form a strip 18 of predetermined length. The catching device 22, after having released the strip 18 so obtained on said conveyor belt 24, moves away and picks up again the sheet 9 of rubber-coated fabric for the subsequent cutting step. At this point, the conveyor belt 24 which moves the strip 18 along the direction N—N is actuated.

In this way, and as a result of subsequent cuts of the sheet 9 of rubber-coated fabric, a plurality of strips 18 having a predetermined prevailing length is obtained. In a subsequent step, each strip 18 is laid down by the same catching device 22 in the receiving position E on the conveyor belt 24, which is intermittently actuated and transfers the strip 18 away from the above-mentioned direction X—X so as to place the strip in the pickup position A.

The positioning device 25 of the strips 18 picks up the strip 18 lying on the belt 24 (pickup position A) by means of the magnetic plate 30 and transfers the same in the desired releasing position B. During such transfer, the device 25 optionally rotates the strip 18 of a predetermined angle with respect to the conveying direction of the conveyor belt 26 provided downstream of the releasing position B.

In the illustrated example, as the conveyor belt 26 is substantially aligned with the conveyor belt 15, the device 25 rotates the strip 18 of an angle $\alpha$ equal to the above-mentioned angle $\beta$, which is preferably comprised between 5° and 30°.

In a following step, the strip 18, so rotated and held in the above-mentioned position B by the device 25, is dropped by the device 25 on the conveyor belt 26.

Once the strip 18 has been released, the positioning device 25 of the strips 18 can move forward along the closed loop-shaped track 36 and return to the pickup position A of a new strip 18, repeating the above-described operations.

At the end of the above-mentioned operative steps, a plurality of strips 18 aligned with one another along the conveyor belt 26 and incorporating reinforcing cords 10 inclined of an angle $\alpha$ equal to about 30° with respect to the conveying direction of the conveyor belt 26, is therefore obtained in a substantially continuous manner.

In a further step of the method of the present invention, the strips 18 are spliced at their lateral lip 20, provided along the trailing edge of prevailing length, by means of the splicing device 38, so as to form the belt assembly 39 on the conveyor belt 26 in a substantially continuous manner.

The splicing between consecutive strips 18 occurs by overlapping the lips 20 provided at the edges of prevailing length of adjacent strips 18. More in detail, as illustrated in FIG. 7, the plate 40 movably supported above the conveyor belt 26 carries out the above-mentioned splicing by exerting a pressure in a direction substantially perpendicular to the conveyor belt 26.

In a subsequent step of the method, the belt assembly 39 is cut by the second cutting device 42 along the longitudinal axis l—l thereof, forming two belt strips 19a and 19b, which are conveyed along the directions Y—Y and Z—Z, respectively, towards the conveyor belts 43 and 44.

In the non limiting illustrated example, the belt strip 19a formed on the conveyor belt 43 is used to form the radially inner layer of the belt structure, while the belt strip 19b formed on the belt 44 is used to form the radially outer layer of the belt structure.

In this way, two belt strips 19a and 19b are obtained, not necessarily of the same width, in the sense that the strip intended for forming the radially inner portion of the belt strip of the tire (the belt strip 19a, according to the illustrated example) preferably has a width greater than the width of the strip intended for forming the radially outer belt strip portion (the belt strip 19b) so as to provide the edges of the radially superposed portions of the belt strips with a suitable off-set.

In a further step, the belt strips 19a, 19b are cut to size by the cutting devices 47 and 48 in order to obtain the portions 49a, 49b which will be subsequently superposed on the assembly drums 50 and 51.

In a preferred embodiment, the method of the invention comprises the additional step of discarding one of the portions of the belt strips, indicated at 49c, intended to form the radially inner portion of the belt structure.

Such step is carried out on the basis of a signal sent by the sensors 45, 46 which detect the length of the festoon formed by the belt strip 19a in the storage space C defined upstream of the conveyor belt 43. Depending upon such length, the discarded portion may have a different length than that of the used portion.

Preferably, this discarding step is carried out by the pickup device 54 which holds the portion 49c of the belt strip in excess on the magnetic plate 59 which, once demagnetized, releases the portion 49c into the collection container 55 out of line.

In a preferred embodiment, the step of superposing the portions 49a, 49b is carried out by:

i) applying the radially inner portion 49a of the belt strip 19a on the first assembly drum 50, arranged in the assembling position V downstream of the conveyor belt 43 (as illustrated in FIG. 11); according to this embodiment, the portion 49a of the belt strip 19a is tangentially fed at the bottom of the drum 50;

ii) switching the two drums 50 and 51 with one another by rotating of 180° the device 52 for supporting and angularly positioning the drums 50, 51 about an axis R—R perpendicular to the axis A—A of rotation of the above-mentioned drums 50, 51;

iii) applying the radially outer portion 49b of the belt strip 19b on the radially inner portion 49a of the belt strip 19a, by tangentially feeding the portion 49b at the top of the drum 50 which, once rotated, will be located in the assembling position W, downstream of the conveyor belt 44; in this way, on the drum 50 located in the above-mentioned assembling position W, a belt structure is formed with crossed cords in the above-mentioned radially inner and outer portions;

iv) applying a new radially inner portion 49a of the belt strip 19a on the second assembly drum 51 which, once rotated as above indicated, will be located in the assembling position V; such new portion 49a of the belt strip 19a is tangentially fed at the bottom of the drum 51, and v) cyclically repeating steps ii) to iv).

It is clear that in case the rotation directions of the two drums 50 and 51 are opposite with respect to those provided in the illustrated example, the feeding of the portions 49a, 49b of the belt strips 19a, 19b will be accordingly modified, i.e. feeding the radially inner portion 49a of the belt strip 19a at the top of the drum 50 and feeding the radially outer portion 49b of the belt strip 19b at the bottom of the drum 51.

With reference to the above-described plant 1, a method according to the invention for manufacturing a belt package and a crown structure of a green tire, will now be illustrated.

In the embodiment illustrated, the belt structure assembled on the assembly drum positioned in the assembling position W aligned with the conveyor belt 44, is picked up by the first Transfer Ring 65 and transferred to the third assembly drum 66.

In a subsequent step, a layer of circumferentially oriented reinforcing cords 5, i.e. zero degree cords, is coaxially formed on the belt structure supported by the third assembly drum 66.

Preferably, this reinforcing layer has a width substantially equal to the width of the belt structure and is obtained by spirally winding thereon the tape 4, which is produced in a substantially continuous manner by the production line 3.

As illustrated above, the tape 4 is extruded in a substantially continuous manner from the extrusion head 71 and is cooled by providing one or more festoons between the rolls 68, which festoons enable to increase the residence time at room temperature of the tape 4. As an alternative, the above-mentioned festoons may be wound on rolls cooled by means of inner circulation of a suitable coolant.

At the end of the assembling step, the tape 4 is cut to size on the belt structure by a head with a pneumatic shear cutting mechanism (not shown), so as to obtain the belt package.

The method for manufacturing the crown structure comprises an additional step wherein a plurality of treads 7 is prepared in a substantially continuous manner by cutting the substantially continuous tread sheet 74 of rubber mixture in portions having a predetermined length along the cooled conveyor belt 75.

As illustrated above, the tread 7 is extruded in the form of a continuous tread sheet 74 from the extrusion head 76 and transported by means of the conveyor belt 75, on which the sheet 74 is cut to size by a shearer, conventional per se and not shown.

In a subsequent step, the tread 7 thus obtained is coaxially applied onto the belt package prepared on the assembly drum 66, possibly with the help of pressing rolls or other means adapted to facilitate the implementation of this step.

Subsequently, the assembly drum 66 is moved by the positioning device 77 from the assembling position H of the belt package and of the crown structure to the pickup position G of the crown structure by means of the second Transfer Ring 78.

Finally, the Transfer Ring 78 transfers the crown structure thus assembled onto an assembly drum, not shown, where the green tire is completed by assembling the crown structure to a previously prepared tire carcass obtained by assembling together the other semi-finished products (liner, carcass ply, sidewalls, beads, and so on) and torically shaped by means of a shaping operation of the carcass.

According to another alternative embodiment of the plant 1 of the present invention, not illustrated, the strips transfer device 16 is essentially constituted only by the positioning device 25 of the strips 18, and by the conveying means 26 for conveying the strips 18 and the belt assembly 39. In detail, the positioning device 25 of the strips 18 picks each strip 18 up directly from the receiving position E of the strips 18, provided downstream of the first cutting device 17 of the sheet 9 of rubber-coated fabric, and places the strips 18 at the releasing position B, onto said conveying means 26 for conveying the strips 18 and the belt assembly 39.

In a third alternative embodiment of the plant 1, not illustrated, the conveyor belts 43 and 44, the cutting devices 47, 48, the pickup device 54, the container 55 and, finally, the assembly drums 50 and 51 are placed in sequence downstream of the conveyor belt 24, along a direction parallel to the conveying axis N—N of the latter, thus making unnecessary the belt conveyor 26 and the positioning device 25, provided in the previously described first alternative embodiment.

Operatively, this requires that, in order to carry out a production change, which implies a different lying angle of the cords of the belt strips 19a, 19b with respect to the equatorial plane of the tire, it will be necessary to rotate all the devices arranged upstream of the cutting device 17, i.e. the creel adapted to supply the reinforcing cords 10 and the extrusion apparatus 8, or in alternative, all the devices arranged downstream of the cutting device 17, of an angle corresponding to the variation of the cutting angle $\beta$.

From what has been described and illustrated above, all the advantages achieved by the invention and especially those related to the possibility of assembling a belt structure in an essentially automatic manner with minimum labor and ensuring a constant and high quality of these products, are immediately apparent.

What is claimed is:

1. A method for manufacturing a belt structure of a vehicle tire, comprising the steps of:

preparing, in a substantially-continuous manner, a belt assembly incorporating reinforcing cords substantially parallel to one another and inclined at a first predetermined angle with respect to a longitudinal axis of the belt assembly;

cutting, in a substantially-continuous manner, the belt assembly along a first cutting direction substantially parallel to the longitudinal axis to obtain first and second substantially-continuous belt strips extending along two conveying directions substantially parallel to one another;

supplying, in a substantially-continuous manner, the first and second belt strips to at least one assembly drum; and superposing on the at least one assembly drum portions of the first and second belt strips, each having predetermined length, to obtain a belt structure comprising radially-superposed portions of the first and second belt strips, wherein in each portion of the first belt strip the reinforcing cords are substantially parallel to one another, wherein in each portion of the second belt strip the reinforcing cords are substantially parallel to one another, and wherein in the radially-superposed portions of the first and second belt strips the reinforcing cords in the first belt strip are inclined in an opposite direction with respect to the reinforcing cords in the second belt strip.

2. The method of claim 1, wherein the step of preparing the belt assembly comprises the steps of:
 forming, in a substantially-continuous manner, a sheet of rubber-coated fabric incorporating a plurality of reinforcing cords substantially parallel to one another;
 transporting the sheet along a predetermined conveying direction;
 cutting the sheet along a second cutting direction forming a second predetermined angle with respect to a conveying direction of the sheet to obtain a plurality of strips of predetermined prevailing length;
 rotating each strip by an angle equal to the first predetermined angle; and
 splicing the rotated strips at an edge of the predetermined prevailing length thereof.

3. The method of claim 1, wherein the step of superposing on the at least one assembly drum portions of the first and second belt strips comprises the steps of:
 a) cutting the first belt strip to form a portion having a length substantially equal to a circumferential development of a first assembly drum;
 b) applying the portion of the first belt strip on the first assembly drum, wherein the first assembly drum and a second assembly drum are coaxially aligned along a substantially-horizontal rotation axis, and wherein the first and second assembly drums are fixed on diametrically opposite sides of a device for supporting and angularly positioning the first and second assembly drums;
 c) rotating the device 180° about an axis perpendicular to the substantially-horizontal rotation axis, thereby switching positions of the first and second assembly drums;
 d) culling the second belt strip to form a portion having a length substantially equal to the length of the portion of the first belt strip;
 e) applying the portion of the second belt strip on the portion of the first belt strip to obtain the belt structure;
 f) switching designations of the first assembly drum and the second assembly drum;
 g) repeating steps a) through f) to obtain additional belt structures.

4. The method of claim 1, further comprising the step of discarding one of the portions of the first and second belt strips.

5. The method of claim 1, wherein the portions of the first and second belt strips are obtained on respective means for conveying the first and second belt strips and the portions of the first and second belt strips along the two conveying directions.

6. The method of claim 5, wherein the belt strips are supplied to the at least one assembly drum by the means for conveying the first and second belt strips and the portions of the first and second belt strips.

7. A method for manufacturing a belt package of a vehicle tire, comprising the steps of:
 a) preparing a belt structure on a first assembly drum by:
  preparing, in a substantially-continuous manner, a belt assembly incorporating reinforcing cords substantially parallel to one another and inclined at a first predetermined angle with respect to a longitudinal axis of the belt assembly;
  cutting, in a substantially-continuous manner, the belt assembly along a first cutting direction substantially parallel to the longitudinal axis to obtain first and second substantially-continuous belt strips extending along two conveying directions substantially parallel to one another;
  supplying, in a substantially-continuous manner, the first and second belt strips to a first assembly drum; and
  superposing on the first assembly drum portions of the first and second belt strips, each having predetermined length, to obtain a belt structure comprising radially-superposed portions of the first and second belt strips, wherein in each portion of the first belt strip the reinforcing cords are substantially parallel to one another, wherein in each portion of the second belt strip the reinforcing cords are substantially parallel to one another, and wherein in the radially-superposed portions of the first and second belt strips the reinforcing cords in the first belt strip are inclined in an opposite direction with respect to the reinforcing cords in the second belt strip;
 b) transferring the belt structure onto a second assembly drum; and
 c) coaxially forming on the belt structure a layer of circumferentially-oriented reinforcing cords, the layer having a maximum length and a maximum width substantially equal to those of the belt structure.

8. The method of claim 7, wherein the layer of reinforcing cords is formed by applying on the belt structure a ribbon of rubber mixture having a predetermined width, wherein the ribbon is coextruded in a substantially-continuous manner together with a plurality of cords prealigned along a direction parallel to an extrusion direction of the ribbon.

9. The method of claim 7, wherein the layer is formed by spirally winding on the belt structure at least one tape of rubber-coated fabric incorporating one or more reinforcing cords.

10. A method for manufacturing a crown structure of a vehicle tire, comprising the steps of:
 a) preparing a belt package on a second assembly drum by:
  preparing, in a substantially-continuous manner, a belt assembly incorporating reinforcing cords substantially parallel to one another and inclined at a first predetermined angle with respect to a longitudinal axis of the belt assembly;
  cutting, in a substantially-continuous manner, the belt assembly along a first cutting direction substantially parallel to the longitudinal axis to obtain first and second substantially-continuous belt strips extending along two conveying directions substantially parallel to one another;
  supplying, in a substantially-continuous manner, the first and second belt strips to a first assembly drum; and
  superposing on the first assembly drum portions of the first and second belt strips, each having predetermined length, to obtain a belt structure comprising radially-superposed portions of the first and second belt strips, wherein in each portion of the first belt strip the reinforcing cords are substantially parallel to one another, wherein in each portion of the second belt strip the reinforcing cords are substantially parallel to one another, and wherein in the radially-superposed portions of the first and second belt strips the reinforcing cords in the first belt strip are inclined in an opposite direction with respect to the reinforcing cords in the second belt strip;

transferring the belt structure onto a second assembly drum;

coaxially forming on the belt structure a layer of circumferentially-oriented reinforcing cords, the layer having a maximum length and a maximum width substantially equal to those of the belt structure;

b) providing, in a substantially-continuous manner, a plurality of treads by cutting a substantially continuous tread sheet of rubber mixture in portions of predetermined length; and c) coaxially applying one of the treads on the belt package.

11. The method of claim 10, wherein the treads are formed by extrusion in a substantially-continuous manner.

12. A method for manufacturing a green tire comprising the steps of:

preparing a carcass structure;

torically shaping the carcass structure;

preparing a belt structure;

arranging the belt structure as a crown around the carcass structure torically shaped; and wrapping a tread around the belt structure;

wherein the step of preparing the belt structure comprises the steps of:

preparing, in a substantially-continuous manner, a belt assembly incorporating reinforcing cords substantially parallel to one another and inclined at a first predetermined angle with respect to a longitudinal axis of the belt assembly;

cutting, in a substantially-continuous manner, the belt assembly along a first cutting direction substantially parallel to the longitudinal axis to obtain first and second substantially-continuous belt strips extending along two conveying directions substantially parallel to one another;

supplying, in a substantially-continuous manner, the first and second belt strips to at least one assembly drum; and superposing on the at least one assembly drum portions of the first and second belt strips, each having predetermined length, to obtain a belt structure comprising radially-superposed portions of the first and second belt strips, wherein in each portion of the first belt strip the reinforcing cords are substantially parallel to one another, wherein in each portion of the second belt strip the reinforcing cords are substantially parallel to one another, and wherein in the radially-superposed portions of the first and second belt strips the reinforcing cords in the first belt strip are inclined in an opposite direction with respect to the reinforcing cords in the second belt strip.

13. The method of claim 12, wherein the step of preparing the belt assembly comprises the steps of:

forming, in a substantially-continuous manner, a sheet of rubber-coated fabric incorporating a plurality of reinforcing cords substantially parallel to one another;

transporting the sheet along a predetermined conveying direction;

cutting the sheet along a second cutting direction forming a second predetermined angle with respect to a conveying direction of the sheet to obtain a plurality of strips of predetermined prevailing length;

rotating each strip by an angle equal to the first predetermined angle; and splicing the rotated strips at an edge of the predetermined prevailing length thereof.

14. The method of claim 12, wherein the step of superposing on the at least one assembly drum portions of the first and second belt strips comprises the steps of:

a) cutting the first belt strip to form a portion having a length substantially equal to a circumferential development of a first assembly drum;

b) applying the portion of the first belt strip on the first assembly drum, wherein the first assembly drum and a second assembly drum are coaxially aligned along a substantially-horizontal rotation axis, and wherein the first and second assembly drums are fixed on diametrically opposite sides of a device for supporting and angularly positioning the first and second assembly drums;

c) rotating the device 180° about an axis perpendicular to the substantially-horizontal rotation axis, thereby switching positions of the first and second assembly drums;

d) cutting the second belt strip to form a portion having a length substantially equal to the length of the portion of the first belt strip;

e) applying the portion of the second belt strip on the portion of the first belt strip to obtain the belt structure;

f) switching designations of the first assembly drum and the second assembly drum;

g) repeating steps a) through f) to obtain additional belt structures.

15. The method of claim 12, further comprising the step of discarding one of the portions of the first and second belt strips.

16. The method of claim 12, wherein the portions of the first and second belt strips are obtained on respective means for conveying the first and second belt strips and the portions of the first and second belt strips along the two conveying directions.

17. The method of claim 16, wherein the belt strips are supplied to the at least one assembly drum by the means for conveying the first and second belt strips and the portions of the first and second belt strips.

* * * * *

UNITED STATES PATENT AND TRADEMARK OFFICE
CERTIFICATE OF CORRECTION

PATENT NO. : 6,797,095 B2  
DATED : September 28, 2004  
INVENTOR(S) : Gianni Mancini et al.

It is certified that error appears in the above-identified patent and that said Letters Patent is hereby corrected as shown below:

Column 19,
Line 49, "culling" should read -- cutting --.

Signed and Sealed this

Twenty-fourth Day of May, 2005

JON W. DUDAS
*Director of the United States Patent and Trademark Office*